July 10, 1951 T. G. WRIGHTSON ET AL 2,560,058
TUBE AND ROD PRODUCTION
Filed Jan. 29, 1946 7 Sheets-Sheet 1

Inventors:
T. G. Wrightson, and
N. C. Lake,
By their attorneys:
Baldwin & Wight

July 10, 1951 T. G. WRIGHTSON ET AL 2,560,058
TUBE AND ROD PRODUCTION

Filed Jan. 29, 1946 7 Sheets-Sheet 3

July 10, 1951 T. G. WRIGHTSON ET AL 2,560,058
TUBE AND ROD PRODUCTION.
Filed Jan. 29, 1946 7 Sheets-Sheet 5

Inventors:
T. G. Wrightson and
N. C. Lake
By their attorneys.
Baldwin & Wight

Fig. 9.

July 10, 1951 T. G. WRIGHTSON ET AL 2,560,058
TUBE AND ROD PRODUCTION
Filed Jan. 29, 1946 7 Sheets-Sheet 7

Inventors:
T. G. Wrightson, and
H. C. Lake,
By their attorneys:
Baldwin & Wight

Patented July 10, 1951

2,560,058

UNITED STATES PATENT OFFICE 2,560,058

TUBE AND ROD PRODUCTION

Thomas Garmondsway Wrightson, Darlington, and Norman Cecil Lake, Stockton-on-Tees, England, assignors to Head, Wrightson & Company Limited, Thornaby-on-Tees, England Application January 29, 1946, Serial No. 644,018
In Great Britain February 2, 1945

3 Claims. (Cl. 205—22)

This invention relates to tube and rod production.

In the cold drawing of tubes by the plug drawing method, it is usual to take tubes which have had tags previously formed at one end, and to thread the open end over a plug which is attached to a plug rod at the opposite end to an anchorage which is usually adjustable in position, so as to enable the plug to be correctly located in the die whilst drawing is taking place.

To enable the tube to be passed over the plug, it is necessary either to lift the plug vertically or to move it sideways, in order that the tube to be charged over the plug may clear the die plate. Thus, it is necessary for the plug rod to be capable of endwise movement, so as to enable the leading end of the tag to clear the face of the die whilst being moved into position opposite the die. The longitudinal motion of the plug rod is obtained by various means; in some cases this is obtained by hand, and in others by means of air cylinders.

When the tube is in line, then it is customary to pass the tag into and through the die until sufficient projects from the exit face for a drawbench carriage to take hold. The drawbench carriage, having been brought up to the diestand, the drawing grips are engaged with the projecting end of the tag and the hook which is attached to the carriage is lowered into engagement with the drawbench chain, which is generally moving continuously at a fixed speed, but which may be running at slow speed during the period of engagement and afterwards accelerated to any predetermined top speed. The tube is then drawn through the die over the plug. When the tube emerges from the die, the carriage grips are released and the hook disengaged from the chain. It is then necessary to charge a further tube over the plug rod to repeat the cycle.

With such an arrangement, there is obviously a considerable loss of time. In some cases, particularly where light tubes are being handled, two plug rods are provided so as to enable a tube to be charged over one rod whilst the other tube is being drawn from the other rod. Tube drawing plant of this kind heretofore commonly in use is incapable of drawing more than one tube at a time.

One of the objects of the invention is to provide a drawbench in which a plurality of tubes, or a single tube, can be drawn at a time and in which the tubes are handled mechanically.

A further object of the invention is to provide a drawbench having a backbench into which a plurality of tubes, or a single tube, can be fed whilst a plurality of other tubes, or another tube, is being drawn.

According to the present invention the tubes to be drawn are carried by supports such as guide tubes on a rotatable back bench. The tubes are fed to the drawbench by means of a conveyor which brings the tubes into line with the guide tubes into which they are fed by means such as pinch rolls. After the tubes have been fed into the guide tubes the back bench is turned through 180° for example, to bring the tubes into line with dies through which they are drawn over plugs by a drawbench. The plugs are mounted on plug rods, and means are provided for moving the rods so that the plugs are moved automatically into position within the dies when tubes are being drawn thereover, and withdrawn therefrom so as to be clear of the face of the dies when the backbench is not rotated. During the time that these tubes are being drawn through the dies a further number of tubes are moved by the conveyor into line with other guide tubes and fed into these other guide tubes.

In one way of carrying out the invention the tubes which have been tagged and preferably rough straightened, are delivered to the side of a drawbench by means of a bogie or overhead crane, and the tubes are loaded by hand on to an elevating conveyor on which there are fingers at definite intervals corresponding to the centre distance or pitch of the guide tubes. A portion of this conveyor is arranged in the horizontal plane in such a way that one, two or three tubes are brought in line with guides on a rotatable back bench and the conveyor is then stopped by automatically controlled means.

The tubes are loaded on to the conveyor in such a way as to bring their open ends slightly towards the back bench from the axes of a series of pinch rolls when in the open position. These pinch rolls are so mounted as to leave the side opposite the elevating mechanism open, and thus enable the tubes whilst on the conveyors to pass into the gap between the rolls. The pinch rolls are mounted upon levers which are geared together and can be moved in such manner that the rolls can be swung forwards towards the back bench and towards one another until they make contact with the tube or tubes. Provision is made for altering the position of the rolls so that they can deal with tubes of different diameter or shape, and to ensure that when the rollers are in contact with any size of tube they are in their furthest forward position. The object of this arrangement of the pinch rolls is to enable the rolls to be brought clear of the tail or tag end of the tube when this has been delivered from the pinch rolls, so as to ensure that when the rotatable back bench is rotated the ends of the tube will clear the pinch roll housings and other obstructions on the drawbench.

The back bench consists of two rows each of three guide tubes, arranged diametrically opposite each other and enclosed in circular frames supported on rollers, and arranged with some ready means of giving a 180° rotation. For example, a rack and pinion drive from opposed air or hydraulic cylinders, or a geared electrical drive with suitable limiting controls.

Located within each of the guide tubes is a plug rod having at the end which is nearest to the diestand a plug, whilst at the other end remote from the diestand of each of the guide tubes there is provided an air cylinder, on the piston rod of which provision is made for the rapid coupling of the plug rods, a suitable gap being provided at the point of coupling to facilitate this work.

The adjustment of the longitudinal position of the plugs relative to the dies is effected either by mounting the air cylinders in screwed sleeves carried in the rotating back bench structure and intercoupled by means of a back shaft and spur or bevel wheels or chain drives to controlling points located near to the diestand, or the guide tubes on the rotating back bench may be mounted in bearings at each point of support, there being at one end a screwed portion of the tube engaging with a nut. The rotation of either the nut or the tube can be arranged to cause longitudinal movement of the tubes. Suitable stop faces are provided at the end remote from the diestand which engage with the plug rod coupling connection in such a manner as to limit the forward position of the plugs.

Provision is also made to enable plug rods to be changed by threading them through the drawbench die plate, or through the pinch rolls, or, alternatively, to enable the back bench to be rotated through 90° so as to enable the plug rods to be changed and passed alongside the side of the drawbench.

Air is delivered to the cylinders through a suitable pair of rotary valves, and provision is made for the fitting of stop valves, so as to enable any one of the cylinders to be isolated.

In operation, the tubes to be drawn are fed by the pinch rolls into the top row of guide tubes in the rotating backbench whilst the tubes in the corresponding guide tubes in the bottom of the rotating back bench are being drawn over the plugs and through the dies.

Before drawing is completed, the air on the cylinders for actuating the plug rods is reversed so that immediately the tubes emerge from the dies, the plugs and rods are drawn clear to their initial position. Immediately this takes place, the back bench is automatically rotated so as to bring the undrawn tubes opposite the dies. Air is applied, again automtically, to the plug rod cylinders, causing the tubes with their tags to move towards the dies until they come to rest with the tags projecting sufficiently from the exit faces of the dies to enable the drawbench carriage grips to take hold.

The drawbench carriage will then take hold, and drawing will proceed. Whilst this is happening the operator will be causing three further tubes to be passed into the back bench.

It will be seen that since each plug and its rod is guided in a tubular guide the plug will be more or less central with the tube which is charged over it by the pinch rolls.

It will also be seen that the pinch rolls, being both mounted on levers and geared together, will be self-centering. This should avoid a very common difficulty with mechanised feeding arrangements for drawbenches, where it is necessary for the operator to guide the plug and the tube by hand, so as to ensure that the tube passes over the plug readily. This man-handling of oily tubes and plugs is a very messy business and one which should be avoided.

The method of operation described above is suitable for dealing with tubes which have been previously tagged. It can also be readily applied with slight modifications to dealing with tubes which are to be push pointed and drawn in the manner described in the specifications of our British Patents Nos. 567,662 and 569,934. The tubes, in the back bench, after they have been moved into line with the dies, are engaged by driven rollers which feed them forward up to the dies. The push pointer grips are then engaged with the tubes, so as to force these through the dies. When sufficient tube is projecting to enable the carriage grips to take hold, then the plug rod cylinders are actuated, preferably automatically, from the motion of the push pointer so as to bring the plugs into such a position that immediately cold drawing commences, the plugs slide home into the correct relative position with the dies.

Drawing then proceeds in the normal way, and at a convenient point air is reversed on the plug rod cylinders to ensure the rapid clearance of the plugs from the dies.

The arrangements described are suitable for application to a drawbench which is designed for the handling of one relatively large tube, two intermediate size tubes, or three small tubes, at a time. When handling less than three tubes the unnecessary pushing fingers are removed from the elevating conveyors so as to correctly position the tubes on the horizontal portion of the conveyor.

If the drawing bench described above is to be used for drawing rods as well as tubes, the plugs and plug rods, and the mechanism for actuating them are omitted whilst rods are being drawn. If the drawbench is being used for the sinking of tubes, that is, the reduction of the outside diameter by cold drawing without the corresponding reduction in the wall thickness which would take place if a plug were used, then also the plugs and plug rods and the mechanism for actuating them are omitted.

The drawbench described above can be applied to one designed for handling single tubes. In this case the leading conveyor is preferably on the same horizontal plane as the drawing die, so as to avoid elevation of the tubes.

When drawing tubes of small diameter, difficulties are often encountered if these are handled in long lengths, whilst on the other hand, the handling of short lengths of small tubes, with consequent losses due to tagging, is undesirable.

In order to overcome this, the drawbench is provided with two racks, upon one of which the tubes before drawing are placed and then delivered by hand into the pinch rolls which feed them into a guide tube on the backbench. This backbench has also two plug rods, one of which is opposite the die whilst the other is opposite pinch rolls. When drawing is completed, the backbench is rotated through 180° and a further tube brought into line with the die.

The tubes after drawing are discharged onto the opposite rack from that on which they originally rested. This proceeds until all the tubes have been drawn.

The rotating back bench is then traversed sideways across the draw bench so as to bring the charging position opposite the pinch rolls on the rack which now contains the tubes which are then fed into the back bench and drawn as before, this time being discharged on to the opposite rack. This can proceed for two or more passes. The tube, of course, becomes elongated at each pass.

On the rack on to which the tubes will be discharged after their final pass, provision can be made for light rollers, and one or more circular saws for cutting up the tubes into lengths capable of being handled before despatch. The virtue of this arrangement is that it is possible to carry out a series of reductions of the tubes without the necessity for intermediate crane handling. This enables the amount of time and metal lost in cutting up into short pieces and re-tagging to be avoided, and enables a drawbench with a high drawing speed to be used economically, since the time required for acceleration from a low speed of engagement is relatively short.

In the accompanying diagrammatic drawings which illustrate the invention:

Figure 2 is a transverse section on the line 2—2, Figure 1a.

Figure 4 is a transverse section on the line 4—4, Figure 1a;

Figure 10a and b is a plan of a further modification,

Figure 1A:
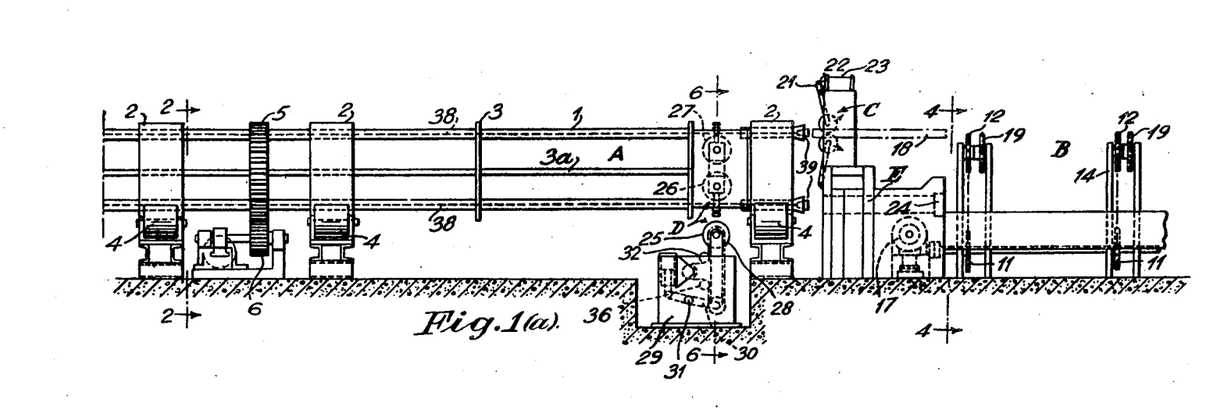
Figure 1a and b is a side elevation of a machine suitable for drawing one, two or three tubes or rods at a time.
Figure 1B:
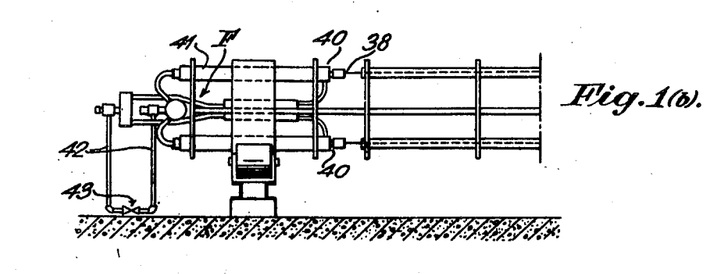
Figure 4:
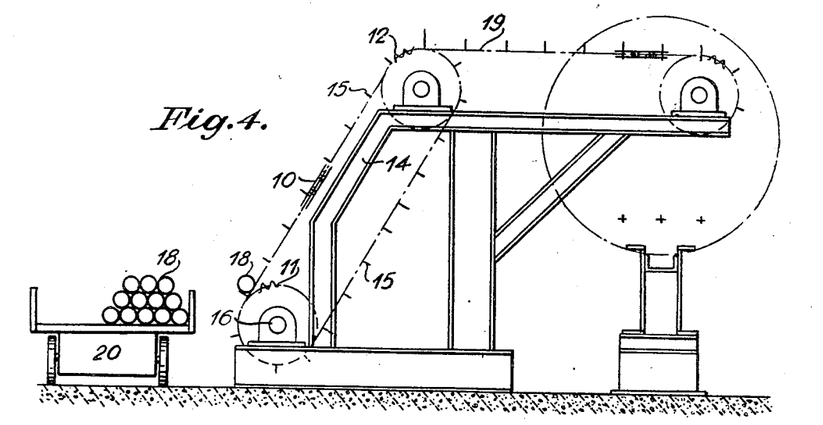

The principal parts of the apparatus are indicated in general in Figures 1a and 1b as follows:

A is a rotatable backbench;

B an elevator conveyor (Fig. 4)

C pinch rolls for feeding tubes from the conveyor B to the rotatable back bench A. (Fig. 5 (a, b, c, d);

D pinch rolls for feeding un-tagged tubes up to the face of the die stand; these pinch rolls are not required when dealing with tubes which have been tagged;

E a die stand;

F means for moving plug rods and plugs away from and up to the face of the die stand —E.

Referring to Figures 1a, 1b, 2 and 3 the rotatable backbench A is formed of guide tubes 1, mounted in drums 2 and supporting discs 3 having tie rods 3a. The drums 2 are rotatably mounted on rollers 4. The rotatable backbench A has fast thereon a geared segment 5 (see Fig. 2) in mesh with a pinion 6 while latter is in mesh with a rack 7 carried by a piston rod 8, which can be reciprocated by fluid operated cylinders 9 to rotate the rotatable backbench A through 180°.

The elevator conveyor B (Fig. 1a and Fig. 4) consists of a series of endless conveyor belts 10, passing over sprockets 11, 12 mounted on supports 14. The conveyor belts 10 are provided with fingers 15. The sprockets 11 are fast on a shaft 16 which can be rotated by a motor 17 to bring tubes 18 from the bottom of the endless conveyor up to a second series of endless belts 19 to a position in line with the three guide tubes, 1, at the top of the rotatable drawbench A. 20 is a bogie on which the tubes 18 are brought to the elevator 10 and loaded thereon by hand.

Figure 5A:
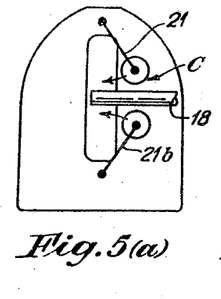
Figures 5a to 5d are diagrammatic views indicating the path of the pinch rolls for feeding the tubes into the backbench.
Figure 5B:
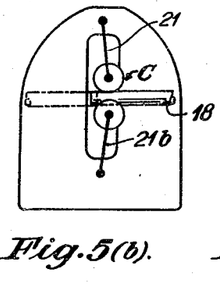
Figure 5C:
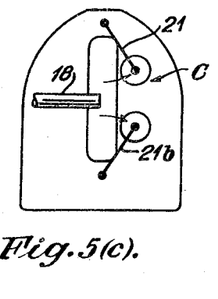
Figure 5D:
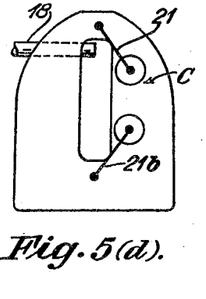
Figure 6:
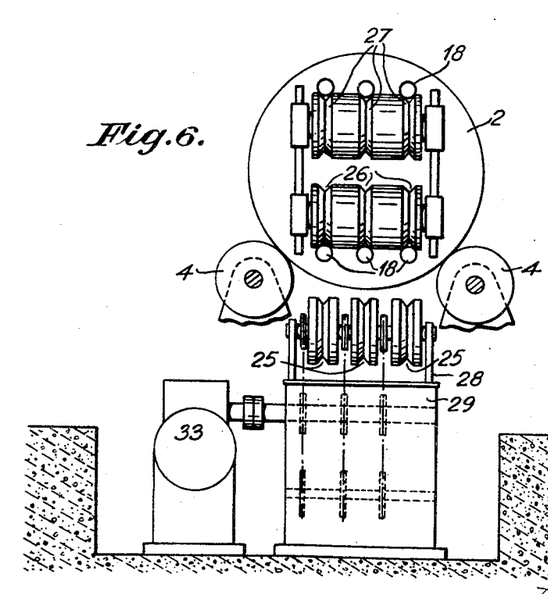
Figure 6 is a transverse section on the line 6—6 of Figure 1a showing pinch rolls which feed the tubes up to the die faces.

C are pinch rolls which as shown diagrammatically can be moved to the positions shown in Fig. 5a, b and c by means of a lever 21 (Figure 1a) connected to a piston rod 22 actuated by a compressed air cylinder 23. The pinch rolls C are geared together in the manner described hereinafter with reference to Figure 9. When the tubes 18 are brought to the position in line with the guide tubes 1 located at the top of the rotatable drum, the pinch rolls C are in their open position as shown in Figure 5a. The rolls C are then moved downwardly and forwardly i. e. towards the rotatable backbench, A, to their closed (i. e. operative) position as shown in Fig. 5b and feed the tubes 18 into the guide tubes 1 to the position shown in dot and peck lines in Figure 5b. The rolls C are then moved back and away from the tubes 18 as shown in Figure 5c leaving the tubes 18 in the guide tubes, 1, in such position that they will clear the rolls C when the rotatable backbench A is rotated 180°. E is a die stand having dies 24. 25 are pinch rolls (Fig. 1a and Figure 6) which cooperate with one or other of two sets of pinch rolls 26, 27, mounted on the rotatable backbench A. The pinch rolls 25 are mounted on the upper end of an arm (or arms) 29 (Fig. 1a) which is slidably mounted in a body 29, in order to raise the pinch rolls into operative position. The lower end of the arm 28 is pivotally connected to one end of a lever 30 pivoted at 31 to the body 29, and the other end of the lever 30 is pivotally connected to a piston rod 32, the piston of which is actuated at the appropriate time by compressed air. The rolls 25 are driven by a motor 33 provided with sprocket wheels 34 which drive an endless chain 35 passing over idle sprocket wheels 36, and sprocket wheels 37, fast on the rolls 25.

38 are plug rods which pass through the guide tubes 1 and are provided at their outer ends with plugs 39. The inner ends of the plug rods 38 are detachably connected to piston rods 40, the pistons of which are located in cylinders 41 and can be driven in either direction therein by compressed air supplied by pipes 42 controlled by a cock 43.

In operation the tubes 18 to be drawn are brought to the elevator conveyor B (Fig. 4) and three of them are placed at the feet thereof. The conveyor B brings the tubes into line with the guide tubes 1, at the top of the rotatable backbench A, the inner ends of the tubes 18 passing between the pinch rolls C which are in their open position (Fig. 5a). The pinch rolls C are now moved to their closed position Fig. 5b and push the tubes 18 from the position shown in full lines in Fig. 5b to the position shown in dot and peck lines in Fig. 5b, the tubes 18 passing over the plugs 39, and plug rods 38 into the guide tubes. The pinch rolls are now withdrawn to the position shown in Fig. 5c.

Figure 2:
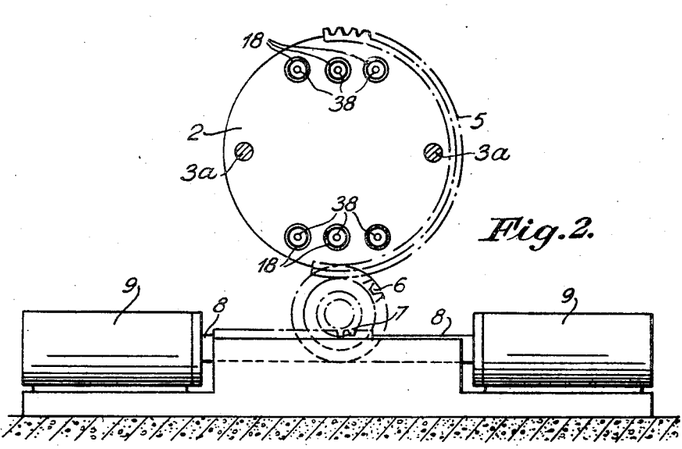
Figure 3:
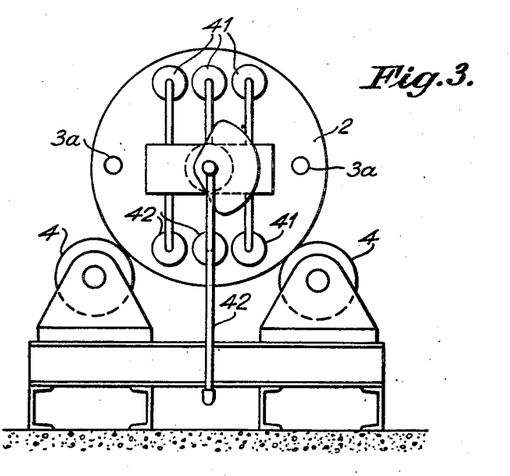
Figure 3 is an end view of Figure 1b.

For tubes which have been tagged prior to feeding to the drawbench, after the withdrawal of the pinch rolls C to the position clear of the tube, Fig. 5c, the rotatable backbench A is now rotated throughout 180° by the rack 7 pinion 6 and segment 5 (Fig. 2). Air is now applied to the cylinders 41 causing the plug rods 38 and plugs 39 to move towards the dies 24 carrying the tubes with them and forcing the tagged ends through the dies 24. The forward movement of the plug rods, plugs and tubes will be arrested when the shoulder formed on the tubes by tagging reaches the face of the dies. There should now be sufficient tag projecting through the exit face of the dies to enable the drawbench carriage grips to take hold so that drawing may proceed in the normal manner. Where tubes have not been previously pointed, before applying air to the plug rod cylinders 41 as described above the pinch rolls 25 are moved by the piston rod 32 through the arm 28 so that the tubes 16 are gripped between the rolls 25 and the rolls 26 on the rotatable backbench A, and moved up to the face of the dies 24. The tubes are then gripped by push pointer grips such as are described in the specification of our British Patents No. 567,662 and No. 569,934 and a sufficient length forced through the die to enable the drawbench carriage grips to take hold. On completion of the push pointing forward stroke air is automatically applied to the cylinders 41 causing the plugs and plug rods to move forward towards the dies. Since push pointing reduces the bore of the tubes the plugs are prevented from taking up their ultimate position in the dies until drawing commences in the normal way when they move to the position determined by the stop faces and the adjustment on the backbench.

In the meantime the operation of conveying three more tubes into line with the guide tubes now at the top of the rotatable backbench A and pushing them into the guide tubes over the plug rods 38 and plugs 39 is repeated, the rotatable drawbench A is rotated 180°, and the operations described above repeated. If it be desired to draw only one or two tubes at a time, this can obviously be effected by placing only one or two tubes in the elevator conveyor. In order to facilitate this the fingers 15 on the elevator conveyor are detachable so that those not required may be removed.

Figure 7:
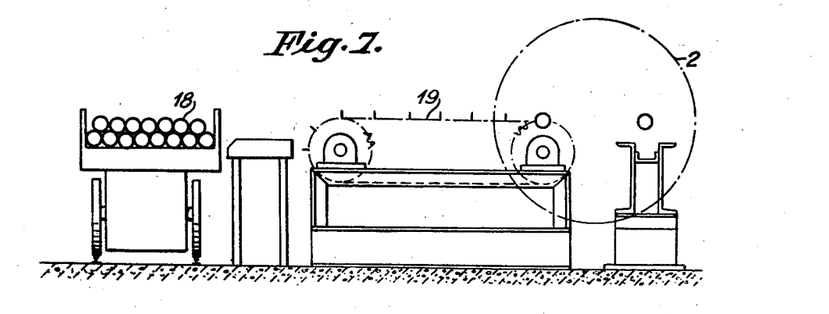
Figures 7, 8 and 9 are detail views of a modification suitable for drawing one tube or rod at a time.
Figure 8:
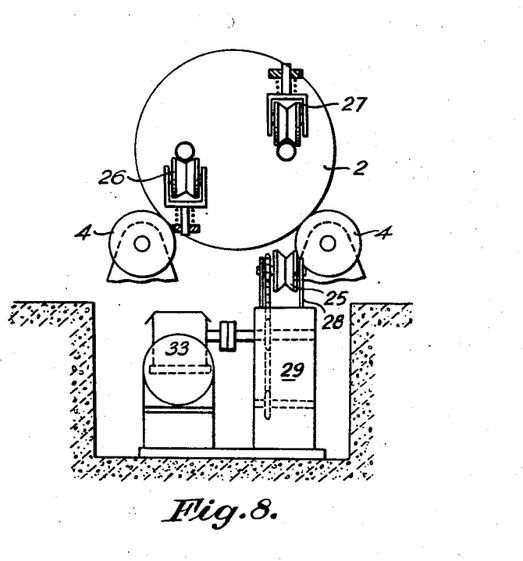
Figure 9:
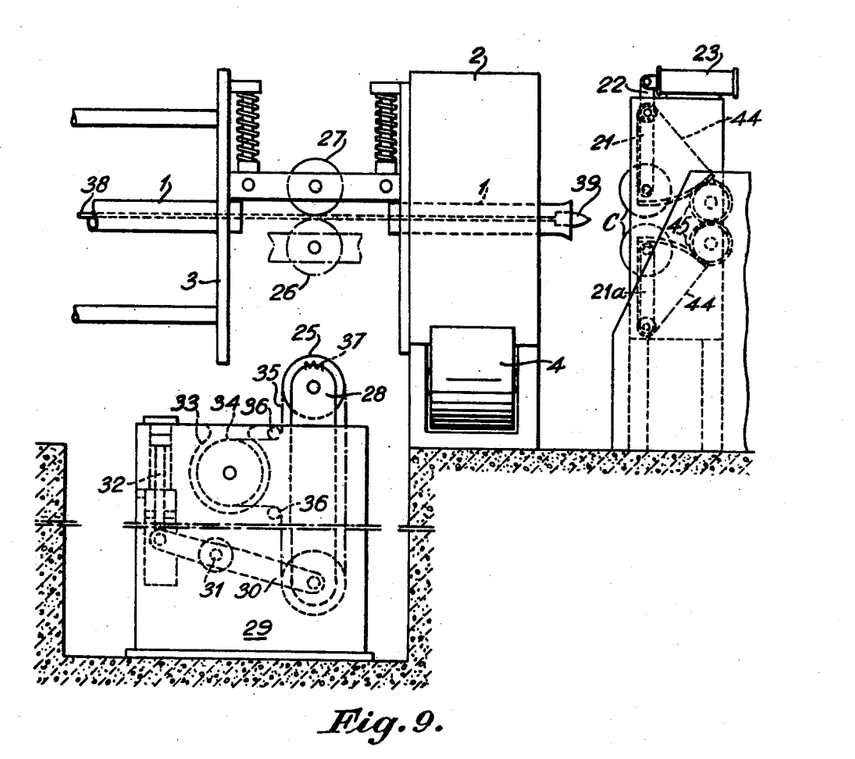

The modification shown in Figures 7, 8 and 9 is suitable for drawing single tubes. The general arrangement is the same as that shown in Figures 1a and b except that the axis of the guide tube holding the tube to be drawn is in the same horizontal plane as the axis of the rotatable back bench; similar parts have similar figures. In Figure 7 the tubes 18 are fed direct to the horizontal conveyor 19 (of Fig. 7) instead of being elevated by a conveyor 10 as in Figure 4.

The pinch rolls C as shown in Figure 9 are rotatably mounted at the extremities of the levers 21, 21a which at their opposite pivotal ends have quadrants 44 mounted thereon which mesh with idle pinions 45 which also mesh with each other so that any movement into or out of operative engagement with the tube 18 of the upper pinch roll C effected by the lever 21 is transmitted to the lower pinch roll C so that the rolls are self centering. The lower pinch roll C is driven in any convenient manner.

When the apparatus is to be used for drawing rods, the plug rods 38, plugs 39, and the means F for moving them up to and away from dies 24 is omitted.

Figures 10A, 10B:
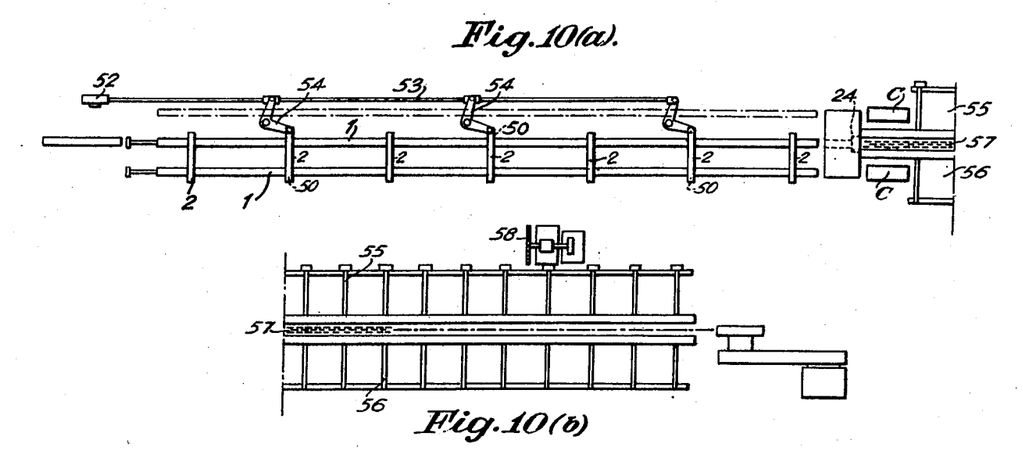
Figure 11:
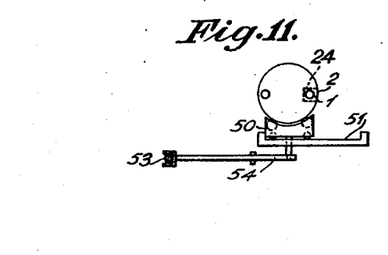
Figure 11 is a side elevation of a detail of Figure 10 showing the parts in one position and Figure 12 shows the parts in Figure 11 in the other position.
Figure 12:
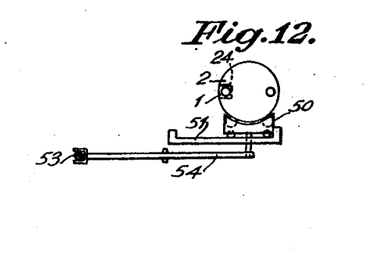

In the modification shown in Figures 10a and b, Figure 11 and Figure 12, the backbench A is rotated as in the previous arrangements. The drums 2 carrying the guide tubes 1 are mounted on slides or supports 50 which can be traversed across the drawbench along a frame 51 from the position shown in Figure 11 to the position shown in Figure 12 by means of fluid operated cylinder 52 which actuates a rod 53 connected to the slides 50 through bell crank levers 54. 55, 56 are racks onto which the tubes 18 can be placed by hand and fed into the pinch rolls C and onto which they can rest after they have been drawn through the die. 57 is a draw chain for drawing the tubes 18 through the die 24. In operation a batch of tubes 18 to be drawn is placed on one of the racks and delivered one at a time by hand into pinch rolls C which feed them into one of the guide tubes 1 on the rotatable backbench A which is then rotated, as in the arrangements previously described, to bring the tube 18 into line with the die 24 through which it is drawn by a drag chain 57, another tube being fed into the other guide tube 1 while this is taking place.

The tubes 18 after drawing are discharged onto the opposite rack from which they originally rested. After the batch of tubes has been drawn the die 24 is changed to the next smaller size and the rotating backbench A is traversed sideways across the drawbench so as to bring the charging position opposite the pinch rolls C on the rack carrying the tubes 18 which are then fed into the backbench and drawn as before, this time being discharged onto the opposite rack. This can proceed for two or more passes, the tube becoming elongated at each pass. If desired the tubes are cut up by the saw 58 into lengths capable of being handled before despatch.

In the claims which follow, the term "tube" is intended to include, where applicable, the term "rod."

What we claim is:

1. In a machine for drawing tubes, a backbench for receiving tubes and moving them into position for drawing, comprising a rotatable unit including a plurality of work-receiving members fixed in the unit in substantially diametrically opposite positions, means for rotating said unit so as to move one of said members into a predetermined position for receiving stock to be drawn and simultaneously moving the opposite member into a predetermined position for feeding stock to be drawn, means for advancing blanks from respective work-receiving members, including a backbench pinch roll adjacent each member and rotatable with said unit, and a complementary pinch roll common to either said backbench pinch roll mounted adjacent the feeding position of said work-receiving members, for movement into and out of driving relation with respective backbench pinch rolls as they are brought into stock feeding position, to advance blanks to be drawn.

2. In a machine for drawing tubes, a backbench for receiving tubes and moving them into position for drawing, comprising a rotatable unit including a plurality of work-receiving members fixed in the unit in substantially diametrically opposite positions, means for rotating said unit so as to move one of said members into a predetermined position for receiving stock to be drawn and simultaneously moving the opposite member into a predetermined position for feeding stock to be drawn, means for feeding blanks to respective members while positioned for receiving blanks, comprising a pair of opposed pinch rolls respectively mounted on supporting arms adjacent said positioned member, for swinging movement in opposite directions toward and from a position in substantial alignment with the axis of said positioned work-receiving member, means inter-connecting respective supporting arms for concerted swinging movement into blank engaging and advancing position for feeding stock to said work-receiving members, and from said position to clear the adjacent end of the backbench when the latter is rotated.

3. In a machine for drawing tubes, a backbench for receiving tubes and moving them into position for drawing, comprising a rotatable unit including a plurality of work-receiving members fixed in the unit in substantially diametrically opposite positions, means for rotating said unit so as to move one of said members into a predetermined position for receiving stock to be drawn and simultaneously moving the opposite member into a predetermined position for feeding stock to be drawn, means for feeding blanks to respective members while positioned for receiving blanks, comprising a pair of opposed pinch rolls respectively mounted on supporting arms adjacent said positioned member, for swinging movement in opposite directions toward and from a position in substantial alignment with the axis of said positioned work-receiving member, means inter-connecting respective supporting arms for concerted swinging movement into blank engaging and advancing position for feeding stock to said work-receiving members, and from said position to clear the adjacent end of the backbench when the latter is rotated, means for advancing blanks from respective work-receiving members, including a backbench pinch roll adjacent each member and rotatable with said unit, and a complementary pinch roll common to either said backbench pinch roll mounted adjacent the feeding position of said work-receiving members, for movement into and out of driving relation with respective backbench pinch rolls as they are brought into stock feeding position, to advance blanks to be drawn.

THOMAS GARMONDSWAY WRIGHTSON.
NORMAN CECIL LAKE.

REFERENCES CITED

The following references are of record in the file of this patent:

UNITED STATES PATENTS

| Number | Name | Date |
| --- | --- | --- |
| 1,932,266 | Engelbertz | Oct. 24, 1933 |
| 1,986,691 | Uebelhart | Jan. 1, 1935 |
| 2,071,208 | Korbuly | Feb. 16, 1937 |
| 2,301,674 | Andrews | Nov. 10, 1942 |
| 2,308,120 | Staples | Jan. 12, 1943 |
| 2,331,953 | Andrews | Oct. 19, 1943 |
| 2,335,939 | Hill | Dec. 7, 1943 |
| 2,371,090 | Westin | Mar. 6, 1945 |
| 2,395,290 | Nye | Feb. 19, 1946 |
| 2,472,231 | Rodder | June 7, 1949 |